(12) United States Patent
Hurwitz et al.

(10) Patent No.: US 10,152,193 B1
(45) Date of Patent: Dec. 11, 2018

(54) SYSTEMS AND METHODS FOR ONLINE COACHING IN A MATCHING SERVICE

(71) Applicant: EHARMONY, INC., Santa Monica, CA (US)

(72) Inventors: Cherie Hurwitz, Santa Monica, CA (US); Joseph Essas, Santa Monica, CA (US); Arvind Mishra, Encino, CA (US)

(73) Assignee: EHARMONY, INC., Los Angeles, CA (US)

( * ) Notice: Subject to any disclaimer, the term of this patent is extended or adjusted under 35 U.S.C. 154(b) by 0 days.

(21) Appl. No.: 13/940,136

(22) Filed: Jul. 11, 2013

Related U.S. Application Data

(60) Provisional application No. 61/671,039, filed on Jul. 12, 2012.

(51) Int. Cl.
*G06F 3/0481* (2013.01)
*H04L 29/06* (2006.01)
*G06Q 30/02* (2012.01)

(52) U.S. Cl.
CPC ........ *G06F 3/0481* (2013.01); *G06F 3/04817* (2013.01); *H04L 65/40* (2013.01); *G06Q 30/0226* (2013.01)

(58) Field of Classification Search
CPC .. G06F 3/0481; G06F 3/04817; G06F 9/4443; G06Q 30/0226; H04L 65/40
USPC ............. 715/753, 738, 772, 745; 705/14.27
See application file for complete search history.

(56) References Cited

U.S. PATENT DOCUMENTS

| | | | |
|---|---|---|---|
| 7,454,357 B2 | 11/2008 | Buckwalter et al. | |
| 2002/0054130 A1* | 5/2002 | Abbott et al. | 345/783 |
| 2002/0078007 A1* | 6/2002 | Herrero | 707/1 |
| 2004/0210661 A1* | 10/2004 | Thompson | 709/228 |
| 2011/0145050 A1* | 6/2011 | Gross et al. | 705/14.25 |
| 2011/0212430 A1* | 9/2011 | Smithmier | G09B 5/06 434/322 |
| 2013/0013387 A1* | 1/2013 | Groverman | 705/14.27 |

* cited by examiner

*Primary Examiner* — Ajay M Bhatia
*Assistant Examiner* — Mong-Shune Chung
(74) *Attorney, Agent, or Firm* — One LLP; Joseph K. Liu

(57) ABSTRACT

The field of the invention relates to systems and methods for operation of an online matching service, and more particularly to systems and methods that coach users of an online matching service to become more timely and active participants. In a preferred embodiment, the system includes a matching system server coupled to a public network and accessible to one or more users. The matching system server includes a database that stores participation data associated with the one or more users. The matching server system is configured to retrieve a user's participation data to calculate the participation progress and provide the participation data and progress for display. If the user selects to perform a task, the matching server system enables the execution of the selected task, updates and stores the user's participation data, and stores the user's updated participation data.

11 Claims, 8 Drawing Sheets

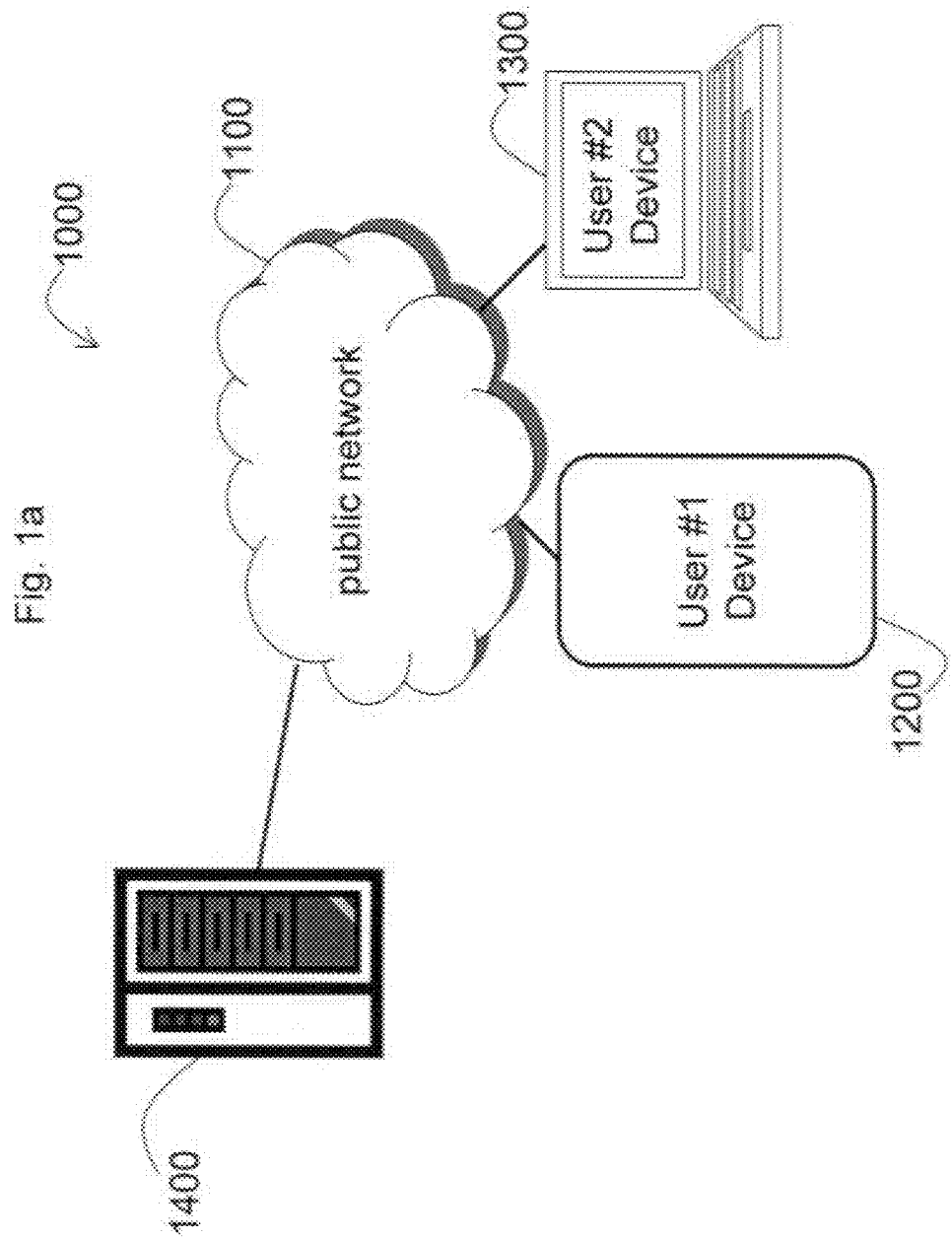

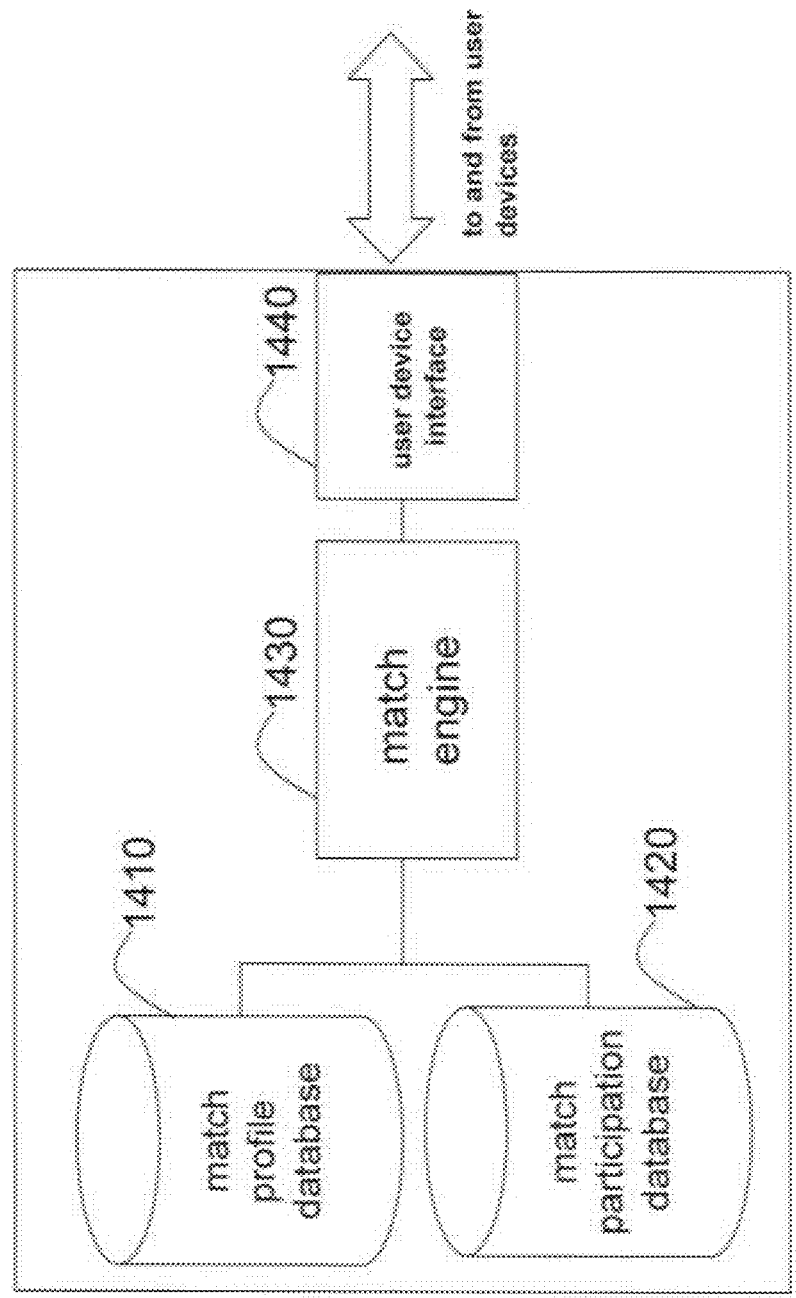

Fig. 3a

Levels 1 to 5

3000

| | 1 | 2 | 3 | 4 | 5 |
|---|---|---|---|---|---|
| | Get Profile Feedback | Archive a match | | View/Archive all Matches | View/Archive all matches |
| | Read "Using eHarmony" Advice | Initiate FT | | Read "About You" Advice | Clean out your inbox (respond to all email or close matches) |
| | Make sure profile conforms to char limits | Initiate CEQ | | Answer 5 Questions | Read The Program Advice Boards |
| | Read personality profile | Send an icebreaker | | Initiate FT with a What if match | Respond to initiation request received same day |
| | Upload 6 approved photos | Send a like | | Initiate CEQ with a What if match | Initiate Comm with a match received same day |
| | Complete your profile | Send a smile | | Respond to an initiation Request | Complete Guided Comm and get to Open Comm with a match |
| 3100 — Complete RQ | Use recommended settings | View a match's profile | | | |
| 3200 — Register | | | | | |

Complete and Improve profile | Learn to use site features

Fig. 3b

Levels 6 to 10

| | | | | |
|---|---|---|---|---|
| View/Archive all matches | View/Archive all matches | View/Archive all matches | View/Archive all matches | View/Archive all matches |
| Clean out your inbox | Clean out your inbox | Clean out your inbox | Clean out your inbox | Clean out your inbox |
| Make a phone call (and log it) | Go on a first date | Go on a second date | Go on a third date | Go on a third date |
| Get in 2-way open comm with 1 match | Make 2 phone calls | Go on a first date | Go on a second date | Go on 3 second dates |
| Initiate comm with 2 matches | Get in 2-way open comm with 2 matches | Make 2 phone calls | Go on 2 first dates | Go on 3 first dates |
| Respond same day to 1 initiation request or contact 1 match same day received | Initiate comm with 3 matches | Get in 2-way open comm with 2 matches | Make 2 phone calls | Make 3 phone calls |
| | Respond same day to 1 initiation request or contact 1 match same day received | Initiate comm with 4 matches | Get in 2-way open comm with 2 matches | Get in 2-way open comm with 3 matches |
| | Read First Date Tips | Respond same day to 1 initiation request or contact 1 match same day received | Initiate comm with 5 matches | Initiate comm with 6 matches |
| | | | Respond same day to 2 initiation requests or contact 2 matches same day received | Respond same day to 3 initiation requests or contact 3 matches same day received |

Engage in activities likely to lead to success for a sustained period

Hi Cherle, here is your weekly eHarmony Progress report
Week 2/27/12 to 3/4/12 — 4000

You're currently an eHarmony Expert — 4100

Your progress in this level is 33% — 4200

Finish this level and get PREPAID COMMUNICATION for free
GO NOW — 4310
— 4300

Overall eH Health: Low — 4400

Higher eH Health means you'll meet your partner quicker. We suggest:
- log in more often
- view more of your matches
- respond to communication more quickly

HOW DID YOU DO THIS WEEK?

| PERCENT VIEWED | 80% | Not bad. We reccommend you view or archive all your matches. Who knows, one of them could surprise you! | — 4600 |
| INITIATION DELAY | 1.3 days | Wow, you are rocking this. Initiating comm with matches quickly will lead to more likely responses so keep it up! | — 4610 |
| RESPONSE DELAY | 3.0 days | Try respond quickly to comm requests. The longer you take, the less likely it'll be that you'll hear back. | — 4620 |

MATCHES VIEWED — 10 — DAILY AVERAGE 1.3 — WEEKLY BEST 20 — 4500

COMM INITIATED — 5 — DAILY AVERAGE 1.3 — WEEKLY BEST 20 — 4510

TWO-WAY COMM — 3 — DAILY AVERAGE 1.3 — WEEKLY BEST 20 — 4520

DATES LOGGED — 1 — DAILY AVERAGE 1.3 — WEEKLY BEST 20 — 4530

Fig. 4

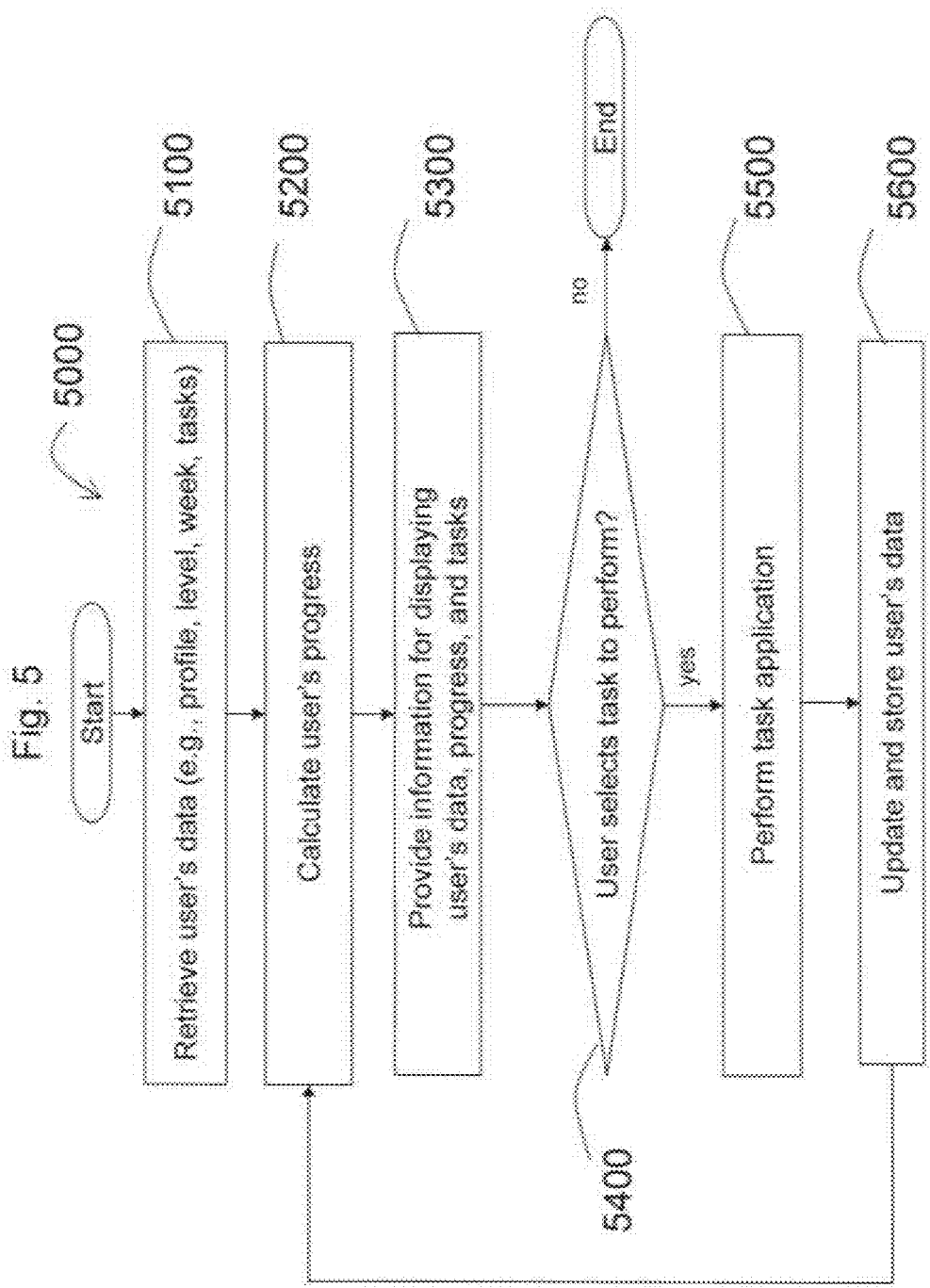

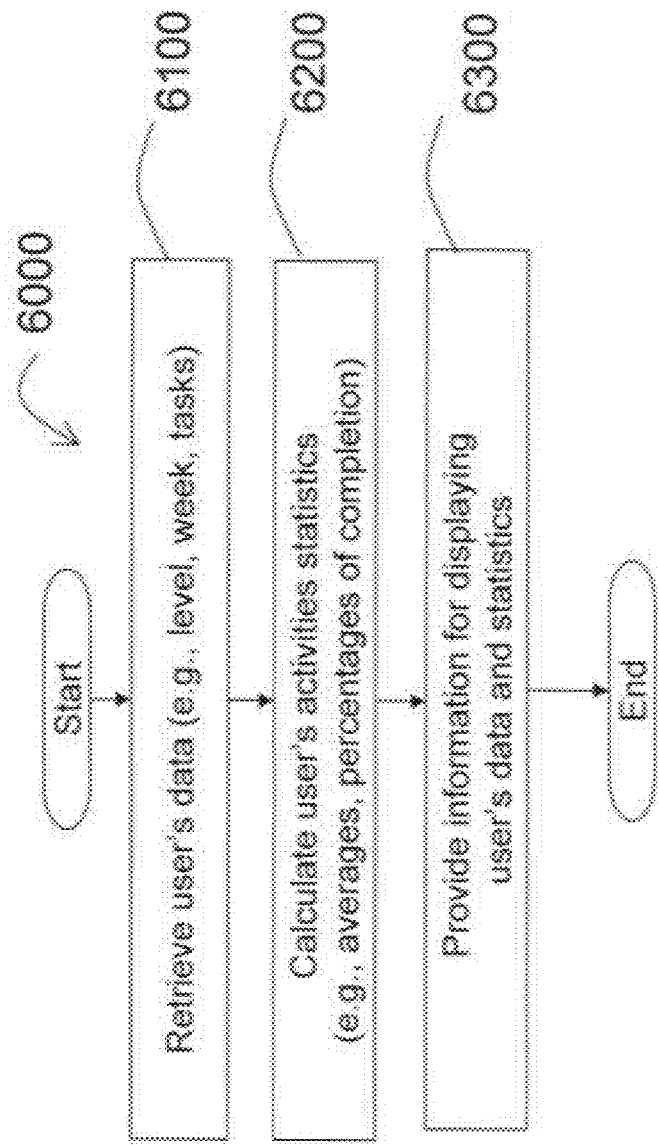

SYSTEMS AND METHODS FOR ONLINE COACHING IN A MATCHING SERVICE

This application claims benefit of U.S. Provisional Application Ser. No. 61/671,039, filed Jul. 12, 2012, which is hereby incorporated by reference in its entirety for all purposes.

FIELD OF THE INVENTION

The field of the invention relates to systems and methods for operation of a matching service, and more particularly to systems and methods that enable online coaching in a matching service.

BACKGROUND OF THE INVENTION

One of the goals of matching services is to help their users achieve successful relationships with other users. Online matching services thus have developed effective systems that identify and match the users who have the potential to establish a successful relationship. A well-known example of such a service is eHarmony, Inc. (which can be found at www.eharmony.com). An online matching service generally collects and stores data to create a "profile" for each user. The online matching service then correlates that user's profile with others in its database to assess which profiles are compatible, i.e., which users have the potential for a successful relationship when matched. The online matching service then presents the compatible profiles to that user.

After the online matching service presents potentially compatible profiles to the user, the user has the option to communicate at the user's own pace with the users whose compatible profiles were presented. Some users may initiate the communication immediately, while others may take some time, or are unsure of what to do next. Some users may follow up their communications with other activities, e.g., meeting (or dating) with the users having the compatible profiles (or compatible matches), while others are slow to take follow-up steps. A successful match may depend on the online and offline activities of its users. For example, the more timely and/or actively a user participates in the communication and the dating processes, the better chance the online matching service may have in finding a successful relationship for that user. In such instances, a user may need assistance or coaching in that regard. Accordingly, systems and methods for coaching users of an online matching service may be desirable.

SUMMARY OF THE INVENTION

The field of the invention relates to systems and methods for operation of an online matching service, and more particularly to systems and methods that coach users of an online matching service to become more timely and active participants.

In a preferred embodiment, the system includes a matching system server coupled to a public network and accessible to one or more users. The matching system server includes a database that stores participation data associated with the one or more users. The matching server system is configured to retrieve a user's participation data to calculate the participation progress and provide the participation data and progress for display. If the user selects to perform a task, the matching server system enables the execution of the selected task, updates and stores the user's participation data, and stores the user's updated participation data.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 1a is an exemplary diagram of an online interpersonal match system in accordance with a preferred embodiment of the present invention;

FIG. 1b is an exemplary diagram of a matching server system in accordance with a preferred embodiment of the present invention;

FIG. 3a is an exemplary diagram of tasks and levels in accordance with a preferred embodiment of the present invention;

FIG. 3b is another exemplary diagram of tasks and levels in accordance with a preferred embodiment of the present invention;

FIG. 4 is an exemplary user interface in accordance with a preferred embodiment of the present invention;

FIG. 5 is an exemplary process of a matching system in accordance with a preferred embodiment of the present invention.

FIG. 6 is another exemplary process of a matching system in accordance with a preferred embodiment of the present invention.

DETAILED DESCRIPTION OF THE PREFERRED EMBODIMENTS

Preferred Systems

Figure 2:
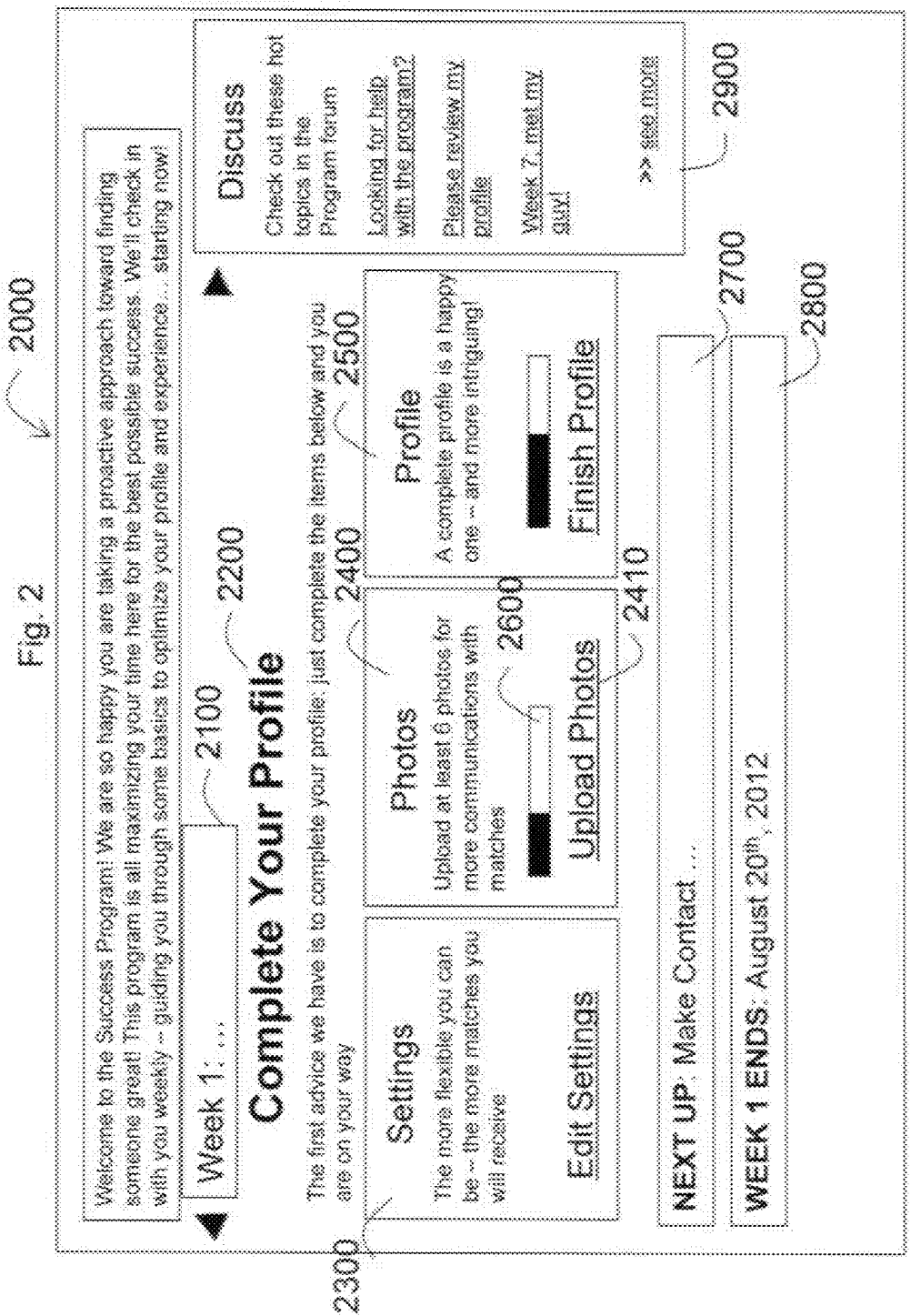
FIG. 2 is an exemplary user interface in accordance with a preferred embodiment of the present invention.

Turning to FIG. 1a, a computer-based compatibility matching system 1000 in accordance with a preferred embodiment of the present invention is shown. The system 1000 generally includes a matching server system 1400, which may be distributed on one or more physical servers, each having processor, memory, an operating system, and input/output interface, and a network interface all known in the art, and a plurality of end user computing devices 1200/1300 coupled to a public network 1100, such as the Internet and/or a cellular-based wireless network.

Turning to the matching server system 1400, an exemplary embodiment is shown in FIG. 1b. Generally, a matching server system 1400 includes a computer application designed to match users to the system 1400 who have the potential to establish a successful interpersonal relationship. To obtain potential matches, each user performs tasks suggested by the matching server system 1400. These tasks include, for example, establishing a "match profile" that includes data and factors potentially relevant to establishing a successful interpersonal relationship with that user, making contacts with other users, and so on. The matching server system 1400 also operates to coach and motivate the users in performing these tasks. An exemplary approach to establishing a match profile for a user is described in detail in U.S. Pat. No. 7,454,357, issued to J. Galen Buckwalter et. al. on Nov. 18, 2008, which is hereby incorporated by reference in its entirety ("the Buckwalter patent").

These match profiles are stored in a match profile database 1410 and organized by the user's match profile identification ("ID"). In the process of creating potential matches for a particular user, a match engine 1430 queries the user's match profile by its respective ID, and correlates that profile with other profiles to calculate one or more compatibility values. If two profiles generate a compatibility value that meets a predefined threshold, then there is potential for the two respective users to have a satisfactory and/or successful interpersonal relationship if matched. Further detail of exemplary systems and processes can be found in the Buckwalter patent.

To coach a user to participate more timely and/or actively, e.g., to perform the suggested tasks, the matching server system 1400 keeps participation data in the participation database 1420 which may be organized by user's identification. The participation data may include, for example, tasks that the user has participated in, all the tasks that the user still need to participate in, the next task the user needs to participate in, and the level and rewards the user has achieved. These tasks are also referred to as activities that the user is coached to perform. Alternatively, the match profile database 1410 and the participation database 1420 may be the same database, or stored in the same database.

The matching server system 1400 is configured to keep track of the user's tasks, calculate progress, levels and rewards, and direct, or suggest to, the user to perform certain online and offline tasks. The tasks may be a part of a program which has a start point, an end point, or no end point. In such a case, the matching server system 1400 is configured to direct the user to perform online and offline tasks with the goal to reach the end point of the program. The number of tasks may be predetermined, or may be expanded or lessened. Levels and rewards may be used as incentives to motivate the users to participate more timely and actively. Each level may comprise a set of one or more tasks. A set of tasks for a level may be predetermined, changeable, or dynamically created, calculated or arranged. A level may include a different set of tasks for different users. The user advances to the next level after completing all the tasks in the current level. Rewards, or points counted toward rewards, may be given when the user has completed certain task, set of tasks, or level. Rewards may be related to the matching service. Rewards may also be anything the user may like, based on the user's profile, the user's activities, or any other inputs from the user. In a program with an end point, upon the user reaching the end point, the matching server system 1400 is configured to evaluate the user's participation data and assess the user's satisfaction. This evaluation and assessment may also be done continuously or at other times, with or without a program.

Turning to FIG. 2, a user interface 2000 on a user's device 1200/1300 in accordance with a preferred embodiment is shown. The user interface 2000 is part of an application on the user's device 1200/1300, e.g., a downloaded webpage, configured to operatively communicate with the matching server system 1400 via the public network 1100. The user interface 2000 on a user's device 1200 is configured to present task information that suggests tasks for the user to perform. Tasks may be organized by time (e.g. week, bi-week, month, or any other length of time) or by level. In one embodiment, where the tasks are organized by week, the task information may include the week number 2100 and the task name 2200 for the week. The task 2200 of the week 2100 may include one or more smaller tasks 2300/2400/2500 to complete for that week. If the task 2200 is divided into smaller tasks, the smaller tasks 2300/2400/2500 are also presented. For example, the task of completing the user's profile 2200 may include the smaller tasks of setting up the profile 2300, uploading photos 2400, and completing more items in the profile 2500. In a different week, the tasks may include, for example, emailing other users, or making other communications with other users, or any other tasks. When a task requires the user to perform something multiple times, a progress bar 2600 shows the user's progress in completing that task. For example, the progress bar 2600 in the task of uploading photos 2500 increases from left to right when the user uploads more photos. Other graphical representation of progress may also be used. The user interface 2000 may also include the end date 2800 of the current week and a brief showing of the task 2700 of the following week. The user can view tasks that the user has completed in the current week or in past weeks. However, the user may not view the tasks for future weeks.

When the user is ready to perform a task, the user selects (e.g., clicks on) that task's button or link. For example, when the user is ready to perform the uploading photos task 2400, the user selects the Upload Photos button or link 2410. It is noted that the user may also select tasks from other user interface points presented by the matching server system 1400, or perform offline tasks independently. The matching server system 1400 is configured to provide the necessary applications for the user to complete the online tasks, e.g., uploading photos, completing user's profile. The matching server system 1400 operates to track the user's online activities and store the tracked data in the participation database 1420. The user's offline activities may be tracked using inputs from the user in a date logger user interface (not shown) presented by the matching server system 1400.

The user interface 2000 is also configured to present coaching advice to the user. For example, in a preferred embodiment, a window 2900 that includes links to advice boards or forums is provided to the user. The advice boards or forums may be those discussing the topics related to the task, or general help about the matching service, or any other advice relating to interpersonal relationships. The window 2900 may also include links to other help topics. It is noted that the matching server system 1400 is configured to also present coaching advice at other user interface points.

Turning to FIGS. 3a and 3b, in accordance with a preferred embodiment, one or more tasks are grouped into participation levels 3000 (referred herein as levels). Levels and tasks may be stored in computer data structures, e.g., table or database. These data structures may be stored in the participation database 1420. The assignment (or grouping) of certain tasks to a particular level may be predetermined, or may be calculated dynamically. Levels are numbered starting at 1. Level number may go as high as the total number of tasks, in which case each level comprises one task. For example, a user starts with level 1 which may include the tasks Complete RQ 3100 and Register 3200.

Some tasks can be completed before the user has achieved the level assigned to those tasks. Some tasks can only be completed until the user's current levels are the same levels as those of the tasks. When the user completes all the tasks in a certain level, the user advances to the next level. When the user completes a level, the matching server system 1400 may also offer reward or rewards to the user. When the user's participation data meets a predefined threshold, the match server system 1400 may assign the user a label. For example, one label may be Expert, another may be Novice. One or more levels may be attributed to one label. In one embodiment, when the user completes all levels, the user reaches the end point of a program.

Turning to FIG. 4, a user interface 4000 on a user's device 1200/1300 in accordance with a preferred embodiment is shown. The user interface 4000 is part of an application on the user's device 1200/1300, e.g., an email or email's content, a downloaded webpage, configured to operatively communicate with the matching server system 1400 via the public network 1100. The user interface 4000 on a first user's device 1200 is configured to present a weekly, or other time based, progress report on the participation data of the user. The progress report may include, for example, the user's current label 4100, the user's progress in completing the current level 4200, reward or rewards 4300 when the current level is completed, and the activities completed during the report period (e.g., 10 matches viewed) (4500-4530). The user interface 4000 also presents statistical information 4600-4620 regarding the activities of the user for the current week. For example, during the current week, the user viewed 80% of the compatible matches presented to the user (4600), the user took an average 1.3 days before initiating communication with the compatible matches (4610), and the user took an average 3.0 days to respond to a communication from a compatible match (4620). A hyperlink 4310 may be provided to enable the user to log into the matching server system 1400, start an online task if the user is already logged in, or to start an offline task. It is noted that the user interface 4000 may include more or less items for different levels, and/or depending on the activities engaged by the user during the reported period.

Preferred Processes

Turning to FIG. 5, a description of the operation 5000 of the online coaching for an online matching service system 1000 is shown. Generally, as mentioned above, a user will rely on the matching server system 1400 to coach the user in performing tasks that may lead to a successful relationship with other potentially compatible users.

Upon a user's logging into the matching server system 1400, the matching server system 1400 retrieves the user's profile data from the database 1410 and the user's participation data from the database 1420 (Action Block 5100). As mentioned above, alternatively, the profile data and the participation data can be stored in the same database.

Based on the user's current week (or other time-based period) information, the matching server system 1400 calculates the progress the user has made toward completing the tasks for the week (Action Block 5200). For example, for week 1, one of a plurality of tasks for the week may be uploading a total of six photos to the matching server system 1400. The matching server system 1400 then calculates the task progress based on the user's data, e.g., the number of photos the user has already uploaded.

The matching server system 1400 next provides information for displaying one or more user's data, one or more user's progresses, and one or more tasks (Action Block 5300) as shown in FIG. 2. The tasks displayed include those that the user is directed to perform.

If the user selects one of the displayed tasks to perform (Decision Block 5400), the matching server system 1400 operates to execute the application associated with the selected task (Action Block 5500).

Upon completion of the execution of the selected task, the matching server system 1400 updates the user's data and stores the updated user's data in the user's participation database 1420 (Action Block 5600). As the user completes the suggested task for the week, the user's progress will need to be re-calculated (Action Block 5200) and provided for re-displaying (Action Block 5300). This process continues until the user does not select any task to perform (Decision Block 5400). At this point, the user will likely log out of the matching server system 1400, or select a different program or application in the matching server system 1400 to run.

Turning to FIG. 6, the matching server system 1400 or the user may select to run a weekly report program 6000. An exemplary weekly report is shown in FIG. 4. The matching server system 1400 retrieves the user's profile data from the database 1410 and the user's participation data from the database 1420 (Action Block 6100). The matching server system 1400 then calculates the user's activities statistics (Action Block 6200). For example, daily average is calculated for the number of compatible matches the matching server system 1400 presented to the user that the user has accessed and viewed for the week; daily average is calculated for the communications with the compatible matches that the user initiated for the week; daily average is calculated for the two-way communications with the compatible matches that the user has had for the week; and daily average is calculated for the number of offline dates the user has had for the week. Other calculations may include the percentage of the compatible matches that the user has viewed; the number of days in delay the user took before initiating a communication or in responding to a communication from another user. The level that the user has achieved and the rewards that the user may be able to get are also calculated. These data and statistics are then provided for display (Action Block 6300).

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for interpersonal relationships; however, the invention can be used for any relationship in general. Additionally and obviously, features may be added or subtracted as desired. Accordingly, the invention is not to be restricted except in light of the attached claims and their equivalents.

What is claimed is:

1. A computer-based system for presenting an online interpersonal relationship analysis and recommendation on a computer network, comprising:

a matching server system operatively coupled to the computer network, comprising:

at least one processor;

at least one database that stores a plurality of user profiles including participation data associated with each user profile in a non-transitory computer readable memory; and instructions, stored in the non-transitory computer-readable memory, wherein, when executed by the processor, the instructions cause the matching server system to selectively:

retrieve a first user's participation data stored in a first user profile associated with the first user from the at least one database;

calculate a participation progress percentage at a current participation progress level for the first user based on:

comparing a current-level number of user-completed online interpersonal tasks with a total number of online interpersonal tasks required to complete the current participation progress level, wherein the total number of online interpersonal tasks required to complete the current level are listed in a list for the current participation progress level;

generate a progress report for the first user including:

a graphical representation of the participation progress percentage;

at least one time-dependent recommendation that is calculated based on an amount of time the first user has taken to complete at least one interpersonal task for the current participation progress level;

a hyperlink adapted to enable the first user to select and start at least one of the online interpersonal tasks from the list of tasks; and for each of the online interpersonal tasks, a graphical icon representing the online interpersonal task;

transmit, via the computer network, at least some of the first user's participation data for the list of online interpersonal tasks for the current participation progress level and the first user's progress report to a user device of the first user;

display the progress report on a user interface of the user device; and upon the server receiving an indication that the first user has selected the at least one of the online interpersonal tasks:

enable the execution of the selected online interpersonal task;

update the first user's participation data; and store the first user's updated participation data, wherein the matching server system is further configured to transmit information about potential matches to the first user based on:

a dynamic compatibility value generated by the server which performs steps for retrieving and correlating the plurality of user profiles with the first user profile and which accounts for interaction with previous potential matches for the first user; and an operation comparing the dynamic compatibility value to a threshold, wherein retrieving and correlating the plurality of user profiles includes calculating a participation progress level for a second user including a list of at least one online interpersonal task for completion by the second user from a series of activities that the first and second users are coached to perform and which are designed to encourage interaction with the system, and wherein timely and active completion of tasks is associated with improved quality results of potential matches.

2. The computer-based system of claim 1, wherein the matching server system is further configured to retrieve the first user's participation data by a predetermined time period.

3. The computer-based system of claim 1, wherein the tasks for at least one level are arranged in a predetermined order.

4. The computer-based system of claim 1 wherein the participation data includes completed tasks, current tasks and future tasks.

5. The computer-based system of claim 1 wherein the participation data includes one or more rewards.

6. The computer-based system of claim 1, wherein the list of tasks for at least one level is predetermined.

7. The computer-based system of claim 1, wherein the list of tasks for at least one level is dynamically created based on the coaching metric.

8. The computer-based system of claim 1, wherein the list of tasks for at least one level is changeable based on the coaching metric.

9. The computer-based system of claim 1, wherein the list of tasks for at least one level is arranged based on the coaching metric.

10. An electronic process for presenting an online interpersonal relationship analysis and recommendation on a computer network, comprising:

instructions stored in a non-transitory computer readable memory of a matching server operatively coupled to the computer network that, when executed by at least one processor of the matching server, cause the matching server to selectively perform steps of:

storing participation data associated with a plurality of user's profiles in an electronic database;

retrieving a first user's participation data stored in a first user profile associated with the first user from the electronic database;

calculating a participation progress percentage at a current participation progress level for the first user based on:

comparing a current-level number of user-completed online interpersonal tasks required with a total number of online interpersonal tasks to complete the current participation progress level;

generating a progress report for the first user including:

a graphical representation of the participation progress percentage;

at least one time-dependent recommendation that is calculated based on an amount of time the first user has taken to complete at least one online interpersonal task for the current participation progress level;

a hyperlink adapted to enable the first user to select and start at least one of the online interpersonal tasks;

transmit, via the computer network, at least some of the first user's participation data for the list of online interpersonal tasks for the current participation progress level and the first user's progress report to a user device of the first user;

display the progress report on a user interface of the user device; and upon the server receiving an indication that the first user has selected the at least one of the online interpersonal tasks:

enabling the execution of the selected task;

updating the first user's participation data; and storing the first user's updated participation data, and transmit information about potential matches to the first user based on:

a dynamic compatibility value generated by the server which performs steps for retrieving and correlating the plurality of user profiles with the first user profile and which accounts for interaction with previous potential matches for the first user; and an operation comparing the dynamic compatibility value to a threshold, wherein retrieving and correlating the plurality of user profiles includes calculating a participation progress level for a second user including a list of at least one online interpersonal task for completion by the second user from a series of activities that the first and second users are coached to perform and which are designed to encourage interaction with the system, wherein timely and active completion of tasks is associated with improved quality results of potential matches.

11. The electronic process of claim 10, further comprising the step of retrieving the first user's participation data by a predetermined time period.

* * * * *